United States Patent
Emberling et al.

(10) Patent No.: US 6,812,928 B2
(45) Date of Patent: Nov. 2, 2004

(54) PERFORMANCE TEXTURE MAPPING BY COMBINING REQUESTS FOR IMAGE DATA

(75) Inventors: Brian D. Emberling, San Mateo, CA (US); Michael G. Lavelle, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 316 days.

(21) Appl. No.: 10/060,978

(22) Filed: Jan. 30, 2002

(65) Prior Publication Data

US 2003/0142102 A1 Jul. 31, 2003

(51) Int. Cl.[7] ............................................. G09G 5/39
(52) U.S. Cl. ................. 345/531; 345/540; 345/503; 345/552; 345/558
(58) Field of Search ............................. 345/418, 582, 345/503, 520, 522, 531, 540, 552, 554, 558, 565, 572

(56) References Cited

U.S. PATENT DOCUMENTS

| | | | |
|---|---|---|---|
| 5,986,677 A | * 11/1999 | Jones et al. | 345/531 |
| 6,133,923 A | 10/2000 | Ozawa | |
| 6,288,730 B1 | * 9/2001 | Duluk, Jr. et al. | 345/552 |
| 6,430,680 B1 | * 8/2002 | Burky et al. | 712/225 |
| 6,526,495 B1 | * 2/2003 | Sevalia et al. | 711/173 |
| 6,587,110 B1 | * 7/2003 | Kunimatsu et al. | 345/502 |
| 2003/0093637 A1 | * 5/2003 | Lee et al. | 711/159 |

* cited by examiner

*Primary Examiner*—Ulka J. Chauhan
(74) *Attorney, Agent, or Firm*—Meyertons Hood Kivlin Kowert & Goetzel, P.C.; Jeffrey C. Hood (57) ABSTRACT

An optimizing unit for use with an interleaved memory and suitable for use in a computer graphics system is described. The unit utilizes knowledge of the repetitive and predictable nature of texture buffer accesses to potentially reduce the number of memory fetches. The unit maintains a queue of pending requests for tiles of data from the memory, and predicts the retrieval of redundant data within short sequences of requests. The redundant data is retrieved from the memory once, and repeated as necessary from local temporary storage registers.

20 Claims, 10 Drawing Sheets

PERFORMANCE TEXTURE MAPPING BY COMBINING REQUESTS FOR IMAGE DATA

BACKGROUND OF THE INVENTION

1. Field of the Invention

This invention relates generally to the field of computer graphics and, more particularly, to texture buffer and controller architecture.

2. Description of the Related Art

With each new generation of graphics system, there is more image data to process and less time in which to process it. This consistent increase in data and data rates places additional burden on the memory systems that form an integral part of the graphics system. Attempts to further improve graphics system performance are now running up against the limitations of these memory systems in general, and memory device limitations in particular.

One example of a memory sub-system defining the upper limit of overall system performance may be the texture buffer of a graphics system. Certain graphics applications such as 3D modeling, virtual reality viewers, and video games may call for the application of an image to a geometric primitive in lieu of a procedurally generated pattern, gradient or solid color. In these applications, geometric primitives carry additional mapping data (e.g., a UV, or UVQ map) which describes how the non-procedural data is to be applied to the primitive. To implement this type of function, a graphics system may employ a texture buffer to store two dimensional image data representative of texture patterns, "environment" maps, "bump" maps, and other types of non-procedural data.

During the rendering process, the mapping data associated with a primitive may be used to interpolate texture map addresses for each pixel in the primitive. The texture map addresses may then be used to retrieve the portion of non-procedural image data in the texture buffer to be applied to the primitive. In some cases (e.g., photo-realistic rendering) a fetch from the texture buffer may result in a neighborhood or tile of texture pixels or texels to be retrieved from the texture buffer and spatially filtered to produce a single texel. In these cases, four or more texels may be retrieved for each displayed pixel, placing a high level of demand on the texture buffer. Thus, poor performance of the texture buffer is capable of affecting a cascading degradation through the graphics system, stalling the render pipeline, and increasing the render or refresh times of displayed images.

In some cases, dynamic random access memory (DRAM) devices may be used to implement a texture buffer as they are generally less expensive and occupy less real estate than static random access memory (SRAM) alternatives. However, DRAM devices have inherent factors such as pre-charge times, activation times, refresh periods, and others which may complicate integration into high bandwidth applications (e.g., high performance graphics systems). Recent advances in DRAM technology, including the introduction of new families (e.g., SDRAM), have increased the throughput of DRAM memories, but have not overcome all of these performance hurdles. Despite performance issues, the use of DRAM devices in graphics systems is still desirable for economic reasons.

In most graphics systems, overall memory bandwidth is of greater importance than memory latency (i.e., priority is placed on producing a continuous stream of video data, rather than on the amount of time it takes to initiate the stream). Additionally, certain data such as texture map data are frequently accessed in a predictable and repetitious manner. It is possible to utilize these characteristics of graphics systems to manage the flow of information from the texture buffer, and hence allow for performance enhancement when the memory devices or memory system is defining the upper limit of system throughput. Therefore, for these reasons, a system and method for improving the performance of memory sub-systems, particularly those employed in the texturing process of graphics systems is desired.

SUMMARY OF THE INVENTION

The problems set forth above may at least in part be solved in some embodiments by a system or method for improving the performance of memory sub-systems, particularly those employed in the texturing process of graphics systems. In one embodiment, the system may include an interleaved memory of DRAM devices configured to receive, store, and recall tiles of image data. A request queue may be configured to receive and store pending requests for data from the memory. Control logic may be coupled to the request queue, and configured to examine series of subsequent requests for tiles in order to detect opportunities for merging requests. Merging opportunities may exist as a result of the regular and predictable manner in which texture data is accessed in a graphics system. In such cases, a short series of requested tiles may contain redundant image data. If the nature of the redundant data is consistent with predefined patterns, then the control logic may combine requests, and thereby potentially reduce the number of memory accesses. In combining requests, image data received in response to memory requests may be stored in temporary registers, and reused to build a requested tile that contains redundant image data. In one embodiment, selection logic may be employed to select the source of image data, and output a tile. The source of the image data may be the temporary registers, or the memory. To affect the combination, the control logic may generate an operation code indicative of the tile processing to be performed (i.e., fetch a requested tile from memory, or build the requested tile from stored redundant data). In some embodiments, a state machine may be coupled to the control logic, and may decode and respond to the operation code by generating a sequence of control signals which direct the memory, temporary registers and selection logic to perform the desired actions.

As noted above, a method for improving the performance of memory sub-systems, particularly those employed in the texturing process of graphics systems is also contemplated. In one embodiment, the method includes maintaining a list of pending requests for data from the memory. A fixed length sequence of the requests may be examined and a determination made as to whether an opportunity to merge requests is present. This determination may be made based on the relative location of the tiles of image data requested. In these cases, the memory requests may comprise the base addresses of the requested tiles, and an examination of the base addresses may indicate whether there is sufficient redundant data shared by requests to allow merging them. For example, two subsequent base addresses with a differential of 1, may indicate that the two requested tiles of image data contain redundancy. If the determination is made to combine requests, tiles of image data may be fetched from the memory, and stored in temporary storage structures. A series of tiles may then be generated and output, these tiles comprising image data selected from one or more of the tiles output by the memory, or stored in the temporary structures.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System

Figure 1:
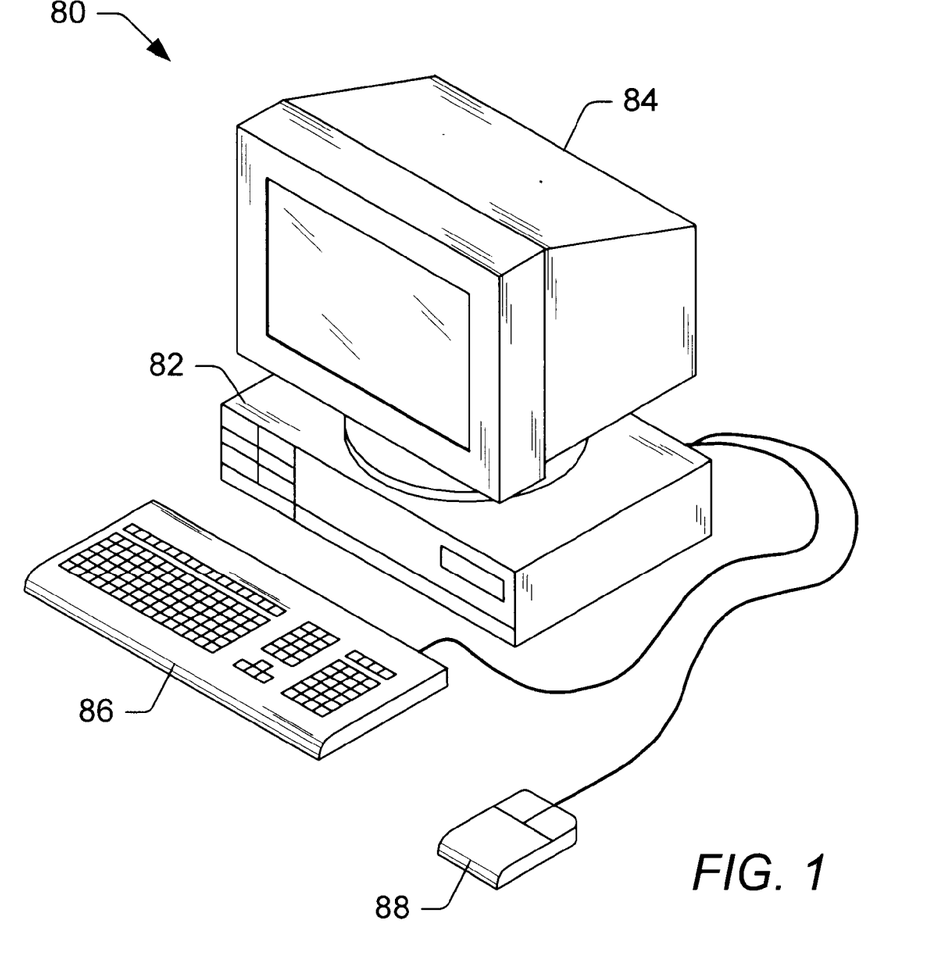
FIG. 1 is a perspective view of one embodiment of a computer system.

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including high definition television (HDTV) systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices including cathode ray tube (CRT), liquid crystal display (LCD) or gas-plasma display. Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
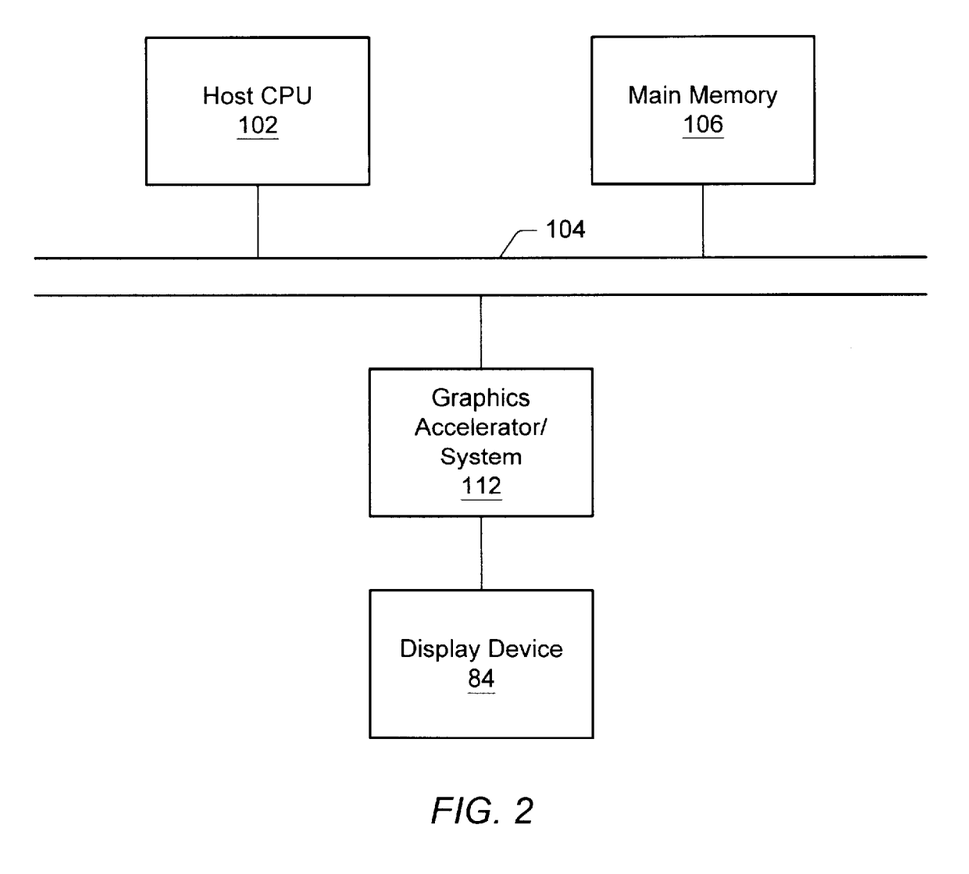
FIG. 2 is a simplified block diagram of one embodiment of a computer system.

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Graphics System

Figure 3:
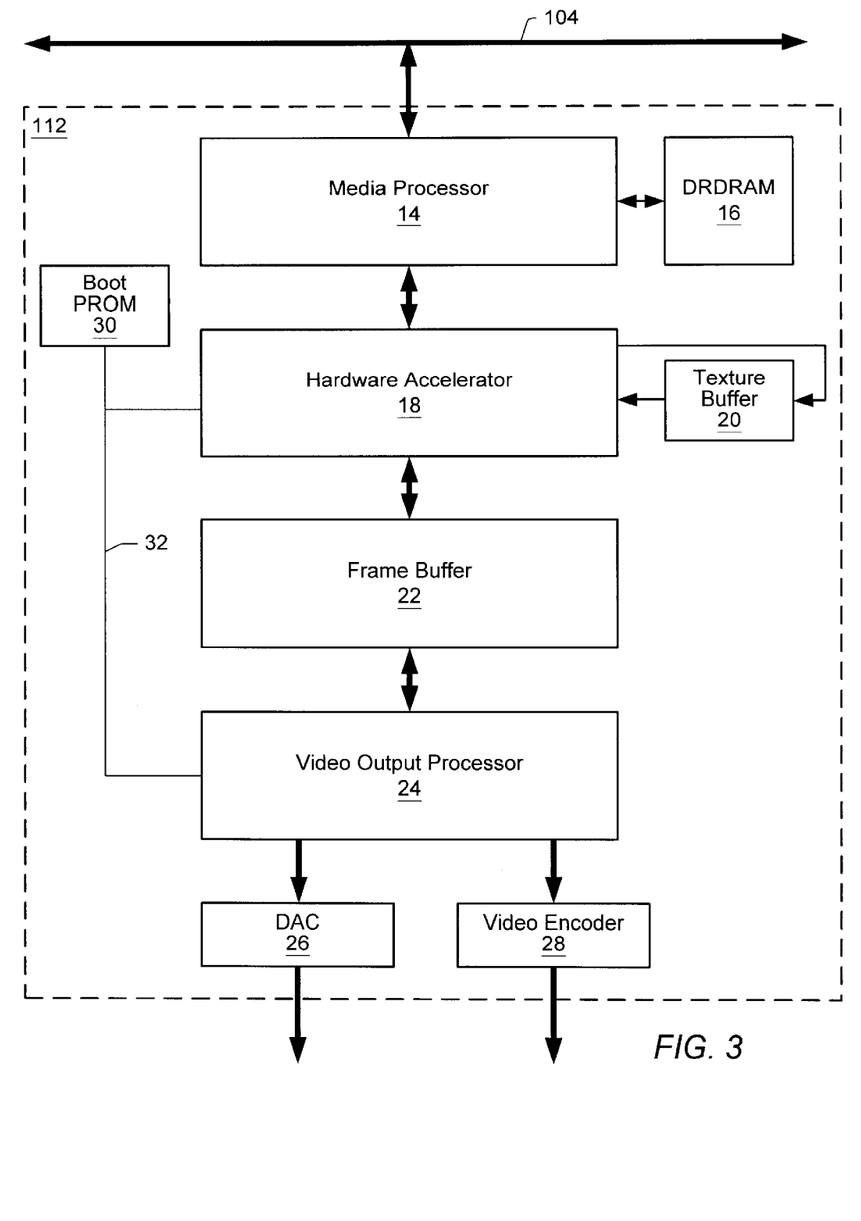
FIG. 3 is a functional block diagram of one embodiment of a graphics system.

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, digital signal processors (DSPs), or general purpose processors).

In some embodiments, one or more of these components may be removed. For example, the video output processor may be excluded from an embodiment that does not provide video output signals to drive a display device. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Media Processor

Figure 4:
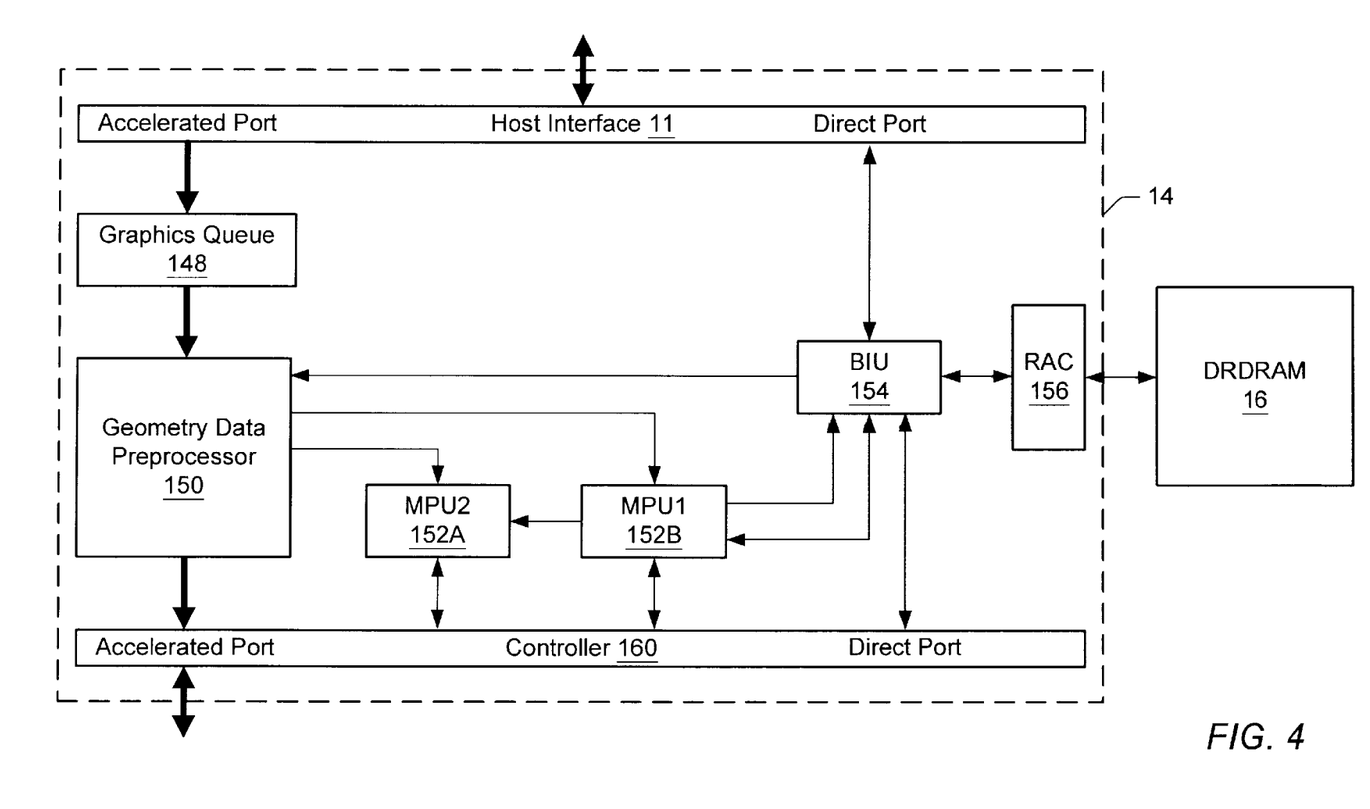
FIG. 4 is a functional block diagram of one embodiment of the media processor of FIG. 3.

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (nonuniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Hardware Accelerator

Figure 5A:
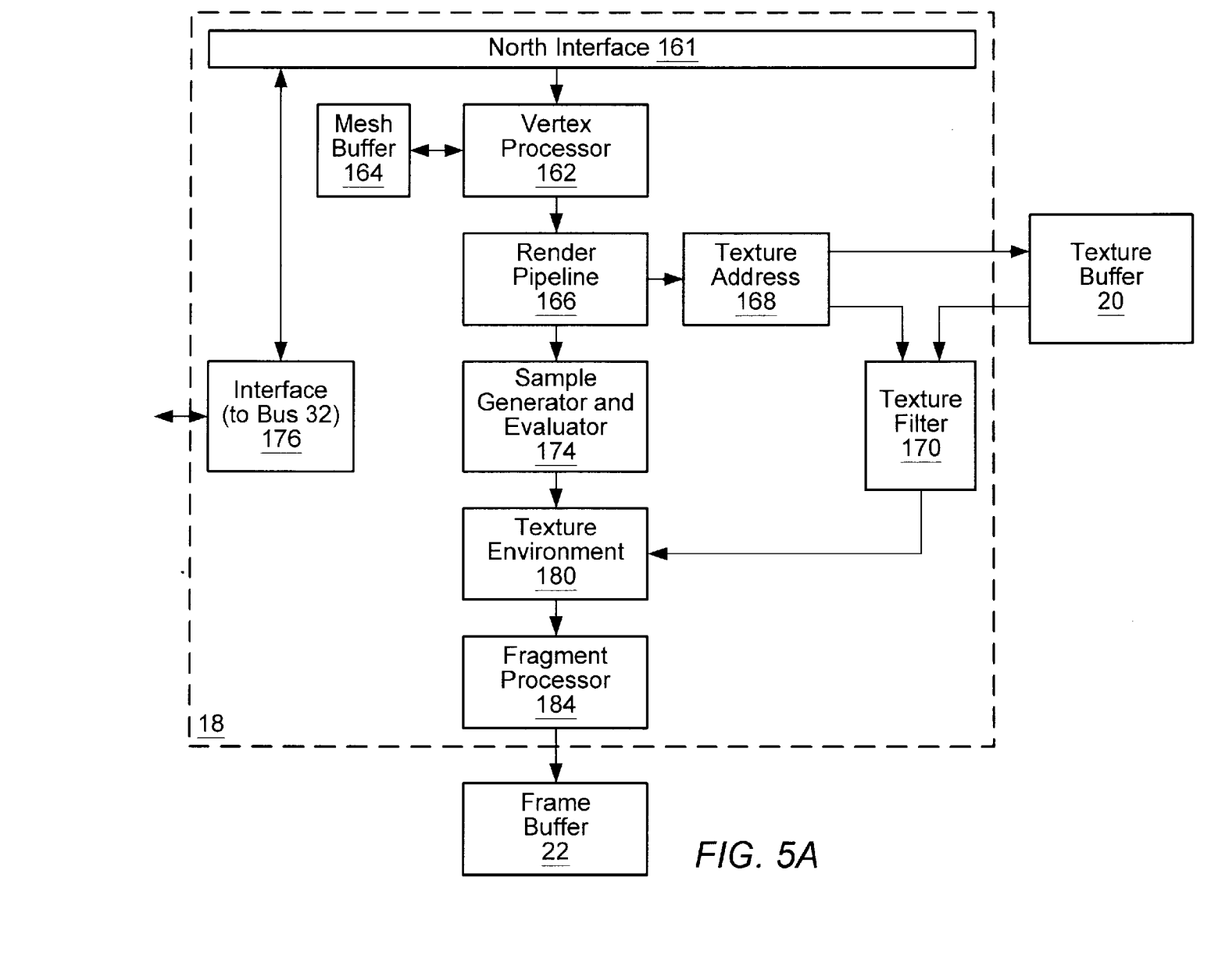
FIG. 5A is a functional block diagram of one embodiment of the hardware accelerator of FIG. 3.

Referring now to FIG. 5A, one embodiment of the hardware accelerator 18 is shown. One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space.

For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM (programmable read-only memory) 30 and/or video output processor 24. Boot PROM 30 may be configured to store system initialization data and/or control code for frame buffer 22. Hardware accelerator 18 may communicate with texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator and evaluator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and request texels from the texture buffer 20 (as described in greater detail below). The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator and evaluator 174. The texture environment 180 may also be used to perform geometric transformations on images (e.g., bilinear scale, rotate, flip) as well as to perform other image filtering operations on texture buffer image data (e.g., bicubic scale and convolutions).

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Video Output Processor

Figure 5B:
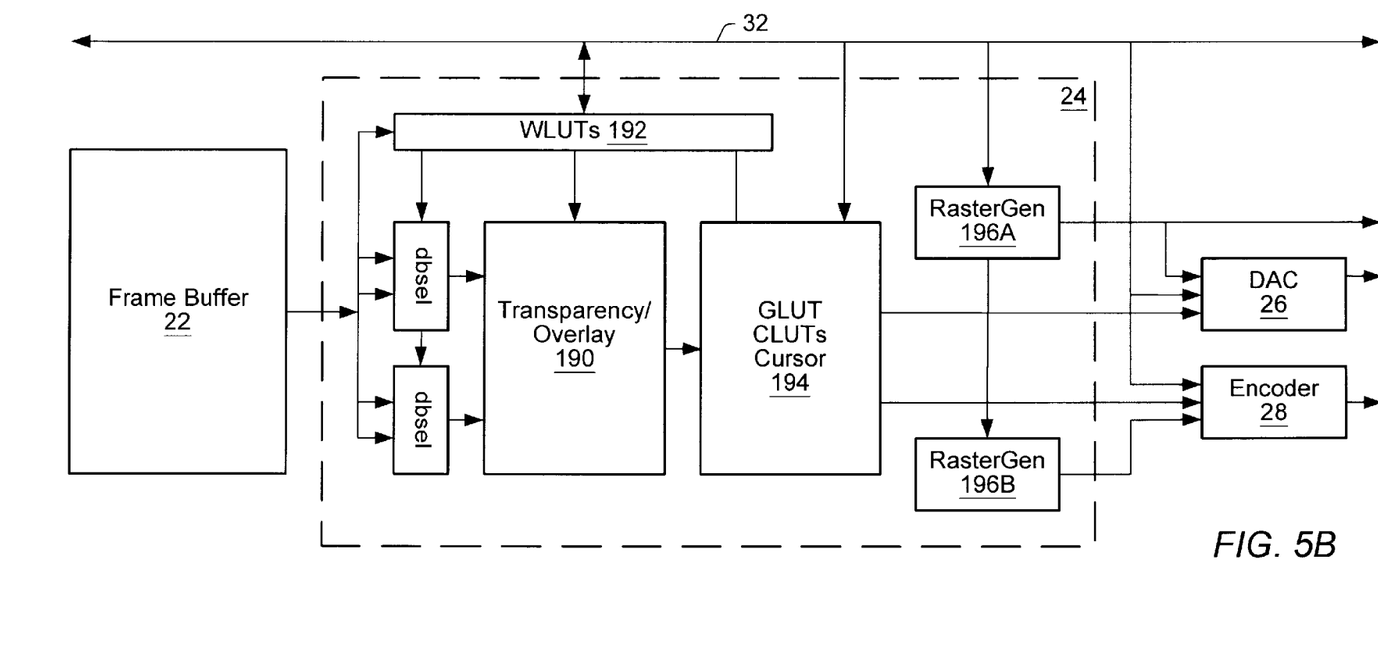
FIG. 5B is a functional block diagram of one embodiment of the video processor of FIG. 3.

In some embodiments, a video output processor 24 may buffer and process pixels output from frame buffer 22 as suggested by FIG. 5B. For example, video output processor 24 may be configured to read bursts of pixels from frame buffer 22. Video output processor 24 may also be configured to perform double buffer selection (dbsel) if the frame buffer 22 is double-buffered, overlay transparency, plane group extraction, gamma correction, pseudocolor or color lookup or bypass, and/or cursor generation. In one embodiment, frame buffer 22 may include multiple 3DRAM64 devices that include the transparency overlay function and all or some of the lookup tables. Video output processor 24 may also be configured to support two video output streams to two displays using the two independent video raster timing generators. For example, one raster (e.g., 196A) may drive a 1280×1024 CRT while the other (e.g., 196B) may drive a NTSC or PAL device with encoded television video.

In one embodiment, the video output processor 24 may directly output digital pixel data in lieu of analog video signals. This may be useful when a display device is based on a digital technology (e.g., an LCD-type display or a digital micro-mirror display).

DAC and Encoder

In some embodiments, the video output processor 24 may be configured to output a stream of digital video data to a DAC (digital to analog converter) 26. The DAC 26 may, in turn be configured to provide a high resolution RGB analog video output at dot rates of 240 MHz. This analog video output may be used to drive a display device such as a cathode ray tube (CRT) monitor. In some embodiments, the video output processor 24 may also output a stream of digital video data to one or more encoders 28. Each encoder 28 may be configured to supply an encoded video signal to a display (e.g., encoded NTSC or PAL video).

Processing Texel Requests

Figure 6:
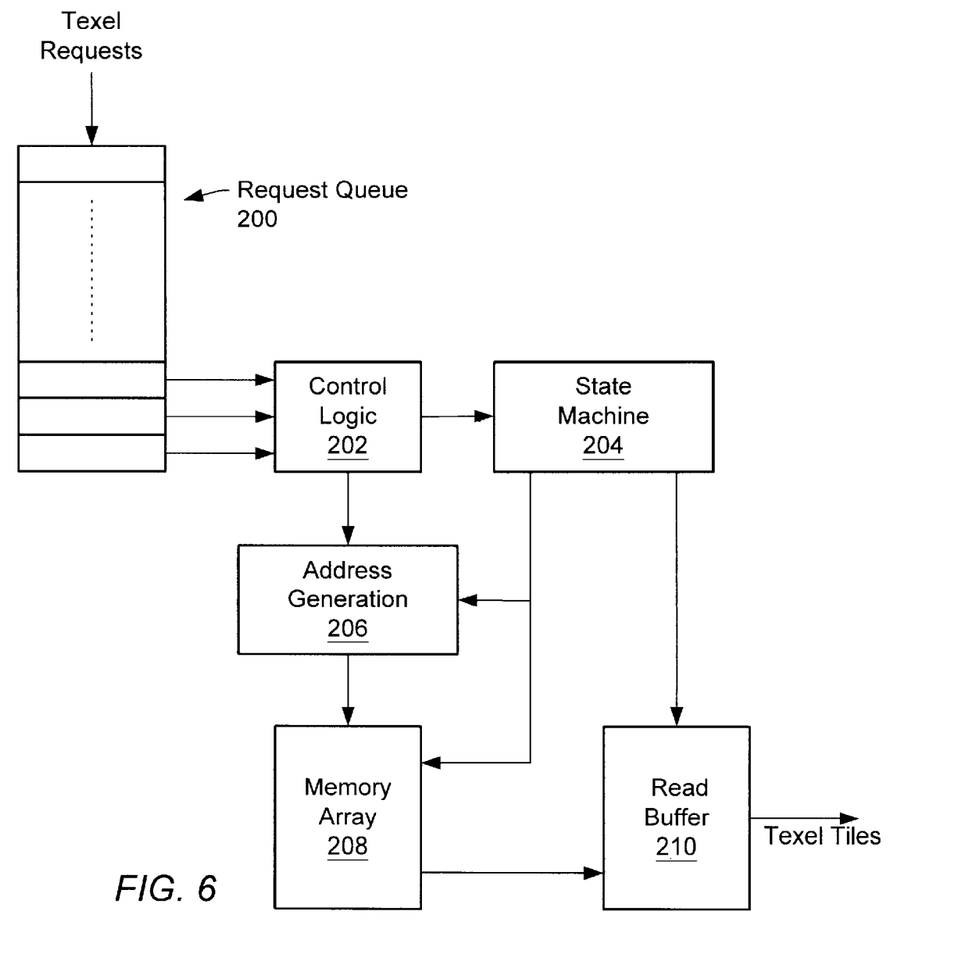
FIG. 6 is a simplified block diagram of one embodiment of a texel request processor.

Turning now to FIG. 6, one embodiment of a texel request processor is shown. In some embodiments, the functional blocks shown in FIG. 6 may be distributed between the texture address 168 (shown in FIG. 5A), and the texture buffer 20. In other embodiments, the entire apparatus may be located within the texture buffer 20. The physical location and distribution of the functional blocks is unimportant to the following description of the texel request processing, and potentially contains a high degree of variability, limited only by the design objective of minimizing the lengths of interconnects.

Requests for texels may be received and pushed onto a request queue 200 which may operate as a first-in-first-out memory (FIFO). The request queue may be small in terms of capacity, and may differ from a conventional FIFO in that parallel access to the bottom three elements (i.e., the three least recently added entries to the queue) may be provided for. For the purposes of this discussion, these three entries will be herein referred to as $R_1$, $R_0$, and $R_1$, where $R_0$ represents the next request in the queue to process, $R_1$ represents the request to be processed after $R_0$, and $R_1$ represents the last request that was processed (i.e., the request which preceded $R_0$).

In some embodiments, $R_0$, $R_1$ and $R_1$ may comprise the base addresses of arrays of spatially contiguous texels. In these embodiments, the base addresses of the three arrays or tiles of texels may be examined by the control logic 202 in order to determine if there are any shared elements or texels. If subsequent tiles are determined to share common elements, then it may be possible to reduce the number of memory operations employed in fetching the tiles.

The control logic 202 may therefore test the base address differential between the three requests, and signal potentially shared elements. For example, if the tiles of texels fetched from the texture buffer 20 are two texels wide and two texels high and two subsequent requests (i.e., $R_0$ and $R_1$, or $R_0$ and $R_1$) have a base address differential of 1, then the requested tiles may share a common column. As another example, assuming the same tile size of two by two texels, a base address differential equal to the width of the texture map image, may indicate that two requested tiles share a common row.

In response to testing the base address differential, the control logic 202 may output the base address of the next tile of texels to fetch, to the address generator 206. Additionally, the control logic 202 may provide an operation code to the state machine 204. This operation code may relay information to the state machine concerning the operations to perform in fetching the requested tile of texels.

The address generator 206 may receive the base address of a tile of texels from the control logic 202. The address generator 206 may utilized the received base address along with information regarding the texture map image size, tile size and the current level of detail (LOD) to generate the addresses of each element in the requested tile. The address generator 206 may also receive control signals from the state machine 204 indicating that a new fetch is to be performed (i.e., the requested information has not been fetched by the previous request), and forcing the generated addresses to be driven onto the bus of the memory array 208.

The memory array 208 may be comprised of one or more banks of DRAM memory. In some embodiments, SDRAM (synchronous dynamic random access memory) devices may be employed. The memory array 208 may receive the addresses of each texel comprising the requested tile from the address generator 206, and control signals from the state machine 204. In response to the address information and control signals, the memory array 208 may output a complete tile of texels.

The read buffer 210 may receive a tile of texel data from the memory array 208 and control signals from the state machine 204. In response to the control signals, the read buffer 210 may store the tile of texel data in a set of temporary registers. Also in response to the control signals, the read buffer 210 may output a tile of texel data. The data comprising the tile conveyed to the output of the read buffer 210 may be the texel data received from the memory array 208, a combination of data received from the memory array 208 and data stored in the temporary registers, or data wholly residing in the temporary registers. The state machine 204 controls the sources of the output data, and how the output tile is constructed (described below) in accordance with the operation code received from the control logic.

In one embodiment of the read buffer 210, the width of the temporary registers, measured in storage cells may be equal to the number of bits in a tile of texel data, and the depth may be sufficient for storing up to two full tiles of texel data. The storage capacity in the temporary registers may vary with each embodiment with a practical lower limit of one tile plus the size of the potential intersecting area between two subsequent tiles. In the previous example, a tile was assumed to be two texels wide and two texels high, therefore, the practical lower limit for the temporary register capacity may be six texels.

In one embodiment, the state machine 204 may receive an operation code from the control logic 202. This operation code may contain information which indicates the sequence of events to perform in order to fulfill the current and pending requests for texel data. The state machine 204 may step through the indicated sequence of events, generating the control signals which fetch, move and store data within the texel request processor.

Figure 7A:
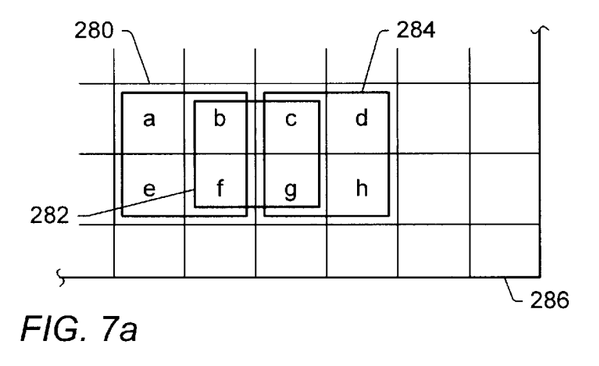
FIG. 7 is a diagrammatic illustration of one example of a series of memory requests which present a merging opportunity.

Turning now to FIG. 7, one example of three subsequent requests for tiles of texel data is illustrated. In FIG. 7a, an area of the texture buffer 20 memory containing the texture map image 286 is shown. The relationship between the three subsequent tiles to be fetched is illustrated. As seen in the figure, the first tile (280) and the second tile (282) overlap, and hence share a common column of texels. Similarly, the second (282) and third (284) tiles overlap and share a common column of texels. This relationship between the requested tiles may be detected by the control logic 202 upon examination of the associated base addresses (i.e., determining that the base address differential is 1).

Figure 7B:
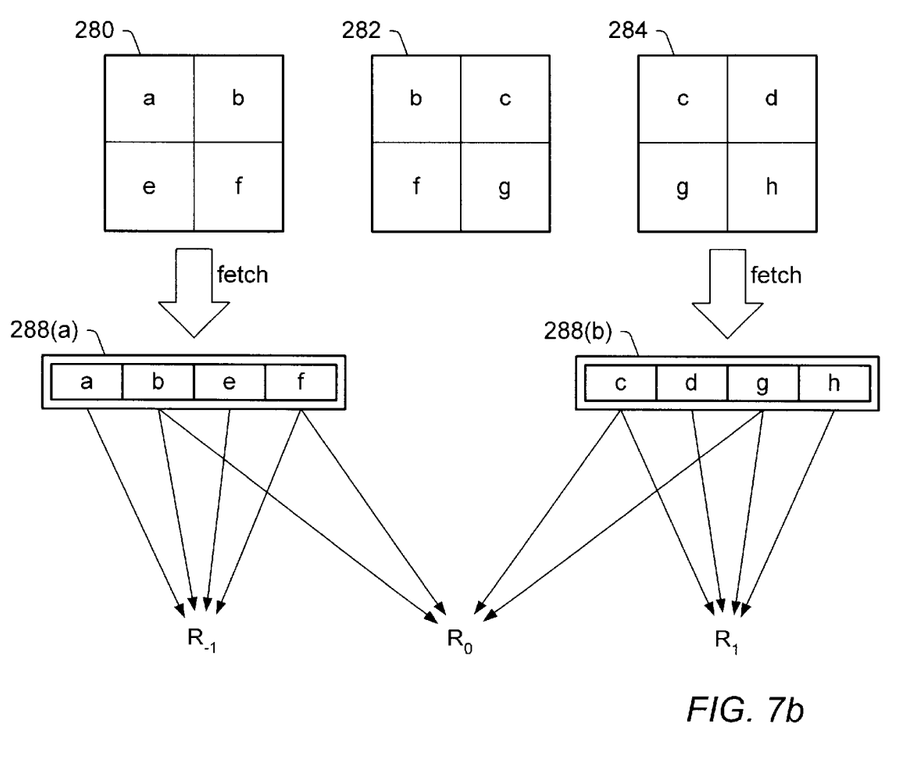

In FIG. 7b, a sequence of events is illustrated which may satisfy the three subsequent requests ($R_1$, $R_0$ and $R_1$) by performing only two texel buffer 20 fetches, thereby potentially reducing the impact of the texel buffer 20 performance on the overall system throughput. The first requested tile may be fetched from the texture buffer 20 and placed in a temporary register 288(a). The contents of the temporary register may then be output from the texel request processor. In response to determining that both the first and third tiles share a common column of texels with the second tile, the fetch of the second tile may be skipped. The third tile may be fetched from the texture buffer 20 and placed in a second temporary register 288(b). In order to satisfy the second request ($R_0$), texels (b) and (f) may be read from the first temporary register 288(a) and texels (c) and (g) may be read from the second temporary register 288(b), the four texels may be used to construct a tile which may then be output. Finally, the contents of the second temporary register may be output in order to satisfy the third request ($R_1$).

Figure 8:
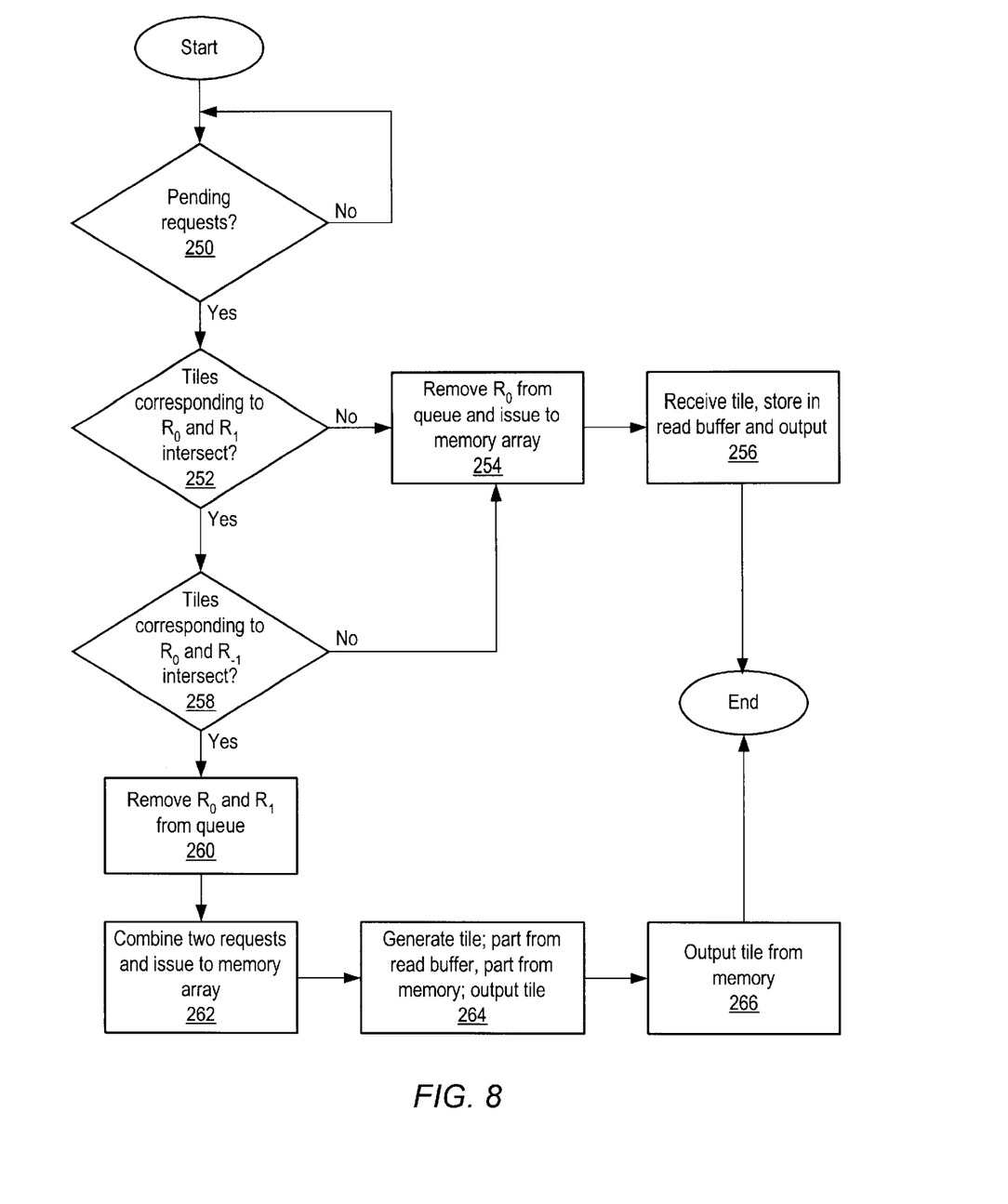
FIG. 8 is a flow diagram illustrating one embodiment of a method for processing texel requests.

Turning now to FIG. 8, a flow diagram illustrates one embodiment of a method for processing texel requests. The process may remain in an idle state, or an idle loop if there are no pending requests for texels (step 250). If there are pending requests, the current request ($R_0$) is first tested against the next future request ($R_1$) to determine whether there are any common elements (i.e., the tiles intersect) (step 252). If there is no intersection found between the two tiles, or if there is only one pending request, then the current request may be removed from the queue and issued to the memory array 208 (step 254). The memory array 208 may respond to the request by returning a tile of texel data, which may be first stored in the read buffer 210, and then output (step 256). If, however, an intersection between $R_0$ and $R_1$ is detected, then $R_0$ is similarly tested against the preceding request ($R_1$) (step 258). If $R_0$ and $R_1$ are found to have no intersection, then there may be no opportunity for merging requests, and execution may branch to step 254. If, however, an intersection is detected between $R_0$ and $R_1$, then an opportunity for combining requests may be indicated. Therefore, $R_0$ and $R_1$ may be removed from the queue, combined, and issued to the memory array 208 (steps 260, 262). The tile requested as part of $R_0$ may then be built in part with texels stored in the read buffer 210 (i.e., the texels common to $R_0$ and $R_1$), and in part with texels received from the memory array (i.e., the texels common to $R_0$ and $R_1$), and then output (step 264). Finally, the tile associated with $R_1$ may be output (step 266) with no further texel buffer 20 fetches, as this tile was received as part of the combined request in step 262.

Figure 9:
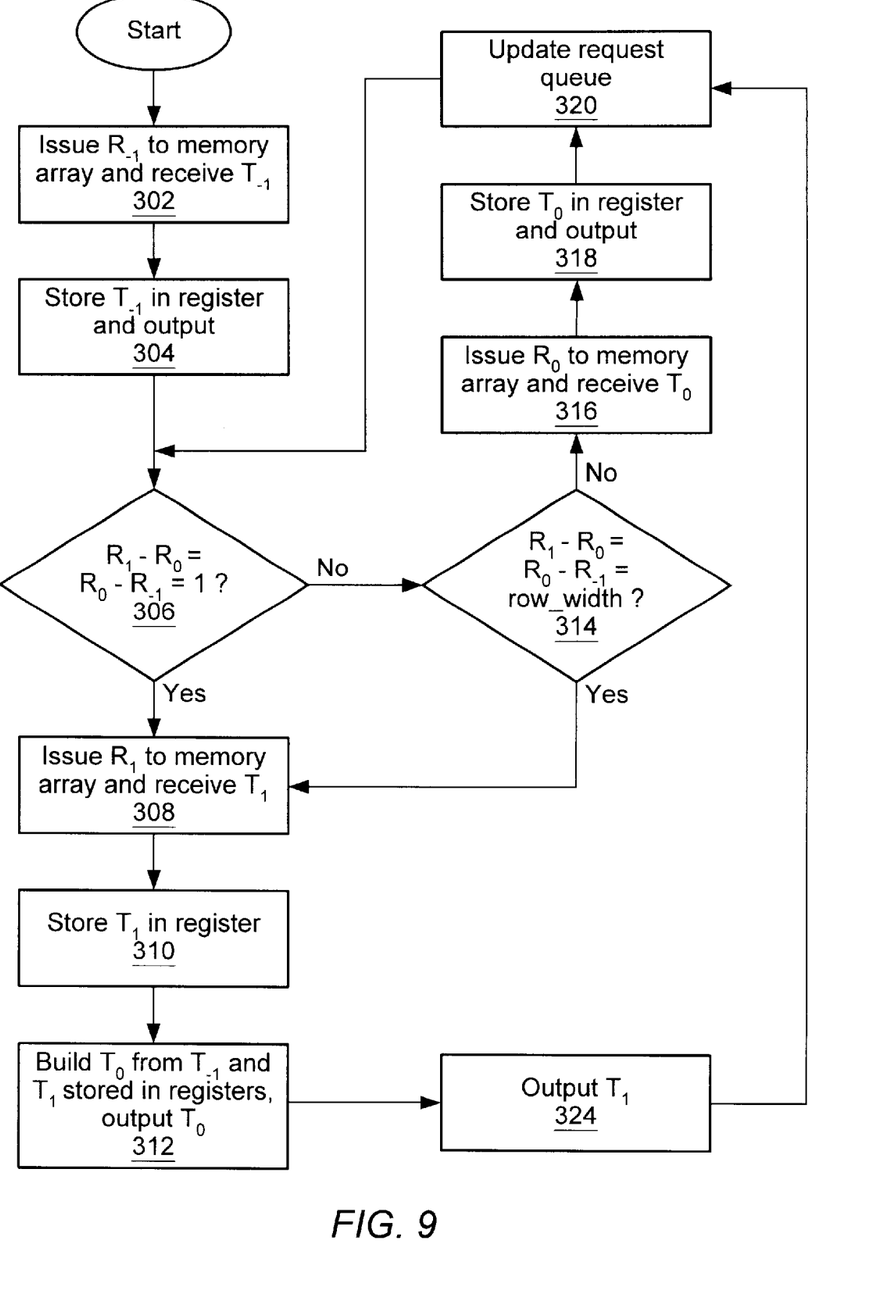
FIG. 9 is a flow diagram illustrating a second embodiment of a method for processing texel requests.

Turning now to FIG. 9, a flow diagram illustrates a second embodiment of a method for processing texel requests. The embodiment illustrated assumes that a continuous stream of texel requests is received by the texel request processor. In other embodiments, a continuous stream of requests may not be achievable, and consequently, wait states or wait loops may be employed.

The process may be initialized by issuing the first request ($R_{-1}$) to the memory array 208. The corresponding tile ($T_{-1}$) may be received, stored in a temporary register, and then conveyed to the output (steps 302, 304). A test may then be performed by calculating the two base address differentials between three subsequent requests ($R_{-1}$, $R_0$, and $R_1$) and arithmetically comparing the results to 1 (step 306). If the two base address differentials are equal to 1, it may be determined that the tiles corresponding to $R_1$ and $R_0$ share a common column of texels, and the tiles corresponding to $R_0$ and $R_1$ share a common column of texels. In this case, $R_1$ is issued to the memory, and the corresponding tile ($T_1$) is received and stored in a temporary register (steps 308, 310). The tile corresponding to $R_0$ ($T_0$) is then built from the texels shared with $T_{-1}$ and $T_1$, and conveyed to the output (step 312). Finally, $T_1$ is read from the associated temporary register and conveyed to the output (step 324).

Referring back to step 306, if the two address differentials are not equal to 1, processing branches to step 314 where the two address differentials may then be tested for equality to the width of a texture map image row. If both address differentials are equal to the width of a row, then it may be determined that the tiles corresponding to $R_1$ and $R_0$ share a common row of texels, and that the tiles corresponding to $R_0$ and $R_1$ share a common row of texels. In this case, processing may branch to step 308 and proceed as described above. If, however, the address differentials indicate no common rows of texels, then there may be no opportunity to combine texel requests. $R_0$ may then be issued to the memory array 208, and the corresponding tile ($T_0$) received (step 316). $T_0$ may then be conveyed to the output (step 318). Before the process is repeated by branching back to step 306, the request queue may be updated (step 320). As part of updating the request queue, $R_1$ may be removed, and $R_0$ and $R_1$ shifted in order that $R_0$ replaces $R_1$, and $R_1$ replaces $R_0$. The next pending request may then replace $R_1$.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a memory configured to receive and store image data, and to output image data in response to a request;
   a request queue configured to buffer requests for the image data stored in the memory; and
   a request processor coupled to the request queue and the memory, and configured to test a series of subsequent requests buffered in the request queue, and according to the results of the testing;
   issue the subsequent requests to the memory, or
   obtain the image data required for a specific one of the subsequent requests from selected portions of the image data received for a subset of the subsequent requests.

2. The graphics system of claim 1, wherein the image data is texture information.

3. The graphics system of claim 2 wherein the graphics system further comprises a rendering unit, wherein the rendering unit is configured to receive and process geometric primitives, wherein the processing of geometric primitives includes applying the texture information to the geometric primitives.

4. The graphics system of claim 3, wherein the rendering unit is further configured to output a stream of image data according to the geometric primitives and the texture information, and wherein the graphics system further comprises one or more display devices configured to display an image according to the stream of image data.

5. The graphics system of claim 1, wherein the memory is configured to output a tile of image data in response to a request for image data, and wherein a tile is a set of spatially contiguous image data.

6. The graphics system of claim 5, wherein a request for image data comprises a base address of a tile of image data.

7. The graphics system of claim 1, wherein the request queue comprises a FIFO memory, wherein the FIFO memory is configured with three output ports, wherein the three output ports are configured to output the three least recently added requests for image data buffered in the request queue.

8. A graphics system comprising:
   an interleaved memory configured to receive and store arrays of data, and to output an array of data in response to a base address, wherein the base address is a logical address corresponding to one element of the array of data;
   a set of registers coupled to the memory, configured to receive and store data from the memory, wherein each register in the set of registers has a data storage capacity equal to the quantity of data contained in an array of data;
   selection logic coupled to the set of registers, and configured to select elements from at least one array of data stored in the set of registers in response to external control signals, wherein the number of selected elements is equal to the number of elements contained in an array of data, and wherein the selection logic is further configured to output the selected elements; and
   controller logic coupled to the memory, the set of registers, and the selection logic, and configured to generate and convey control signals to the memory, the set of registers, and the selection logic in response to receiving requests for arrays of data, wherein the requests for arrays of data comprise the base addresses of the requested arrays of data, wherein the controller logic further comprises a FIFO storage structure, wherein the FIFO storage structure is configured to receive and store the base addresses of requested arrays of data, wherein the controller logic is further configured to examine the arithmetic difference between three subsequent base addresses, and according to the results of the examination: 1) fetch three arrays of data from the interleaved memory, and generate and convey control signals to the selection logic, wherein the control signals direct the selection logic to sequentially output the three arrays of data, or 2) fetch a first array of data from the interleaved memory, fetch a second array of data from the interleaved memory, and generate and convey control signals to the selection logic, wherein the control signals direct the selection logic to output the first and second arrays of data, and output one array of data which is a combination of a subset of elements from the first array of data, and a subset of elements from the second array of data.

9. The graphics system of claim 8, wherein the arrays of data are arrays of texels, wherein texels are texture elements.

10. The graphics system of claim 8, wherein each interleave of the interleaved memory is configured to receive and store one element of the array of data.

11. The graphics system of claim 8, wherein the selection logic is further coupled to the interleaved memory, and configured to select elements from at least one source array of data, wherein the source array of data is stored in the set of registers, or in the interleaved memory, wherein the selection of elements is in response to external control signals, and wherein the number of elements selected is equal to the number of elements contained in an array of data, and wherein the selection logic is further configured to output the selected elements.

12. A method for rendering graphics data, the method comprising:

a) storing image data in a memory buffer, wherein the image data comprises independent image elements, wherein each image element is stored in a unique memory buffer location;
b) receiving requests for neighborhoods of the image data, wherein the neighborhoods of the image data comprise spatially contiguous image elements;
c) fetching two neighborhoods of the image data from a memory in response to a first and a second request for a neighborhood of the image data; and
d) combining image elements from the two neighborhoods of the image data in response to determining that the combination satisfies a third request, otherwise fetching a third neighborhood of the image data from a memory in response to the third request, wherein said combining comprises:
   creating a first set of image elements which represents the intersection of the two neighborhoods corresponding to the first and third requests;
   creating a second set of image elements which represents the intersection of the two neighborhoods corresponding to the second and third requests; and
   creating a resultant neighborhood which represents the union of the first and second sets of image elements.

13. The method of claim 12, wherein the first and second requests of (0 are not contiguous requests.

14. The method of claim 13, wherein the third request is received more recently than the first request, and wherein the third request is received less recently than the second request.

15. The method of claim 12, wherein the requests for neighborhoods of the image data comprise an index, wherein the index indicates the location of the requested image data in the memory buffer, and wherein the determination of (0 is made by arithmetically testing the difference between the index of the first request and the index of the second request.

16. The method of claim 12, wherein the image data may be subdivided into a set of images, wherein each image in the set of images represents a different level of detail, and wherein a subset of the information included in the requests indicates the requested level of detail.

17. A method for mitigating the effect of the performance of an image buffer on the throughput of a graphics system, the method comprising:
a) receiving memory requests for tiles, wherein a tile comprises a set of spatially adjacent image elements;
b) calculating addresses corresponding to the locations of the requested tiles in the image buffer, and storing the addresses in a FIFO storage space;
c) calculating two target address differentials between three subsequent memory requests, and comparing the two target address differentials to a constant k;
d) combining the three subsequent memory requests into two memory requests in response to determining that the two target address differentials are equal to the constant k,
   wherein the tiles received from the image buffer in response to the two memory requests are merged to form a third tile,
   wherein the merging comprises concatenating a column from a first received tile with a column from a second received tile, or concatenating a row from a first received tile with a row from a second received tile, and
   wherein the choice of column-based or row-based merging is dependent on the value of k.

18. The method of claim 17, wherein the constant k corresponds to the address differential between two horizontally adjacent image elements in the image buffer.

19. The method of claim 18, wherein the two target address differentials are compared to a second constant m in response to determining that the two target address differentials are not equal to k, wherein m corresponds to the address differential between two vertically adjacent image elements in the image buffer, and wherein the combination of (0 is executed in response to determining that the two target address differentials are equal to k or m.

20. A method for mitigating the effect of the performance of an image buffer on the throughput of a graphics system, the method comprising:

a) receiving memory requests for tiles, wherein a tile comprises a set of spatially adjacent image elements;

b) calculating addresses corresponding to the locations of the requested tiles in the image buffer, and storing the addresses in a FIFO storage space;

c) calculating two target address differentials between three subsequent memory requests;

d) comparing the two target address differentials to a constant k, wherein the constant k corresponds to the address differential between two horizontally adjacent image elements in the image buffer;

e) combining the three subsequent memory requests into two memory requests in response to determining that the two target address differentials are equal to the constant k, f) comparing the two target address differentials to a constant m in response to determining that the two target address differentials are not equal to k, wherein m corresponds to the address differential between two vertically adjacent image elements in the image buffer; and g) combining the three subsequent memory requests into two memory requests in response to determining that the two target address differentials are equal to m.

* * * * *

UNITED STATES PATENT AND TRADEMARK OFFICE
CERTIFICATE OF CORRECTION

PATENT NO. : 6,812,928 B2
DATED : November 2, 2004
INVENTOR(S) : Emberling et al.

It is certified that error appears in the above-identified patent and that said Letters Patent is hereby corrected as shown below:

<u>Title page, Item [54] and Column 1, line 1,</u>
Title, please delete "PERFORMANCE" and substitute -- PERFORMING --.

Signed and Sealed this

Twenty-fifth Day of January, 2005

JON W. DUDAS
*Director of the United States Patent and Trademark Office*